Patented Aug. 18, 1953

2,649,418

UNITED STATES PATENT OFFICE 2,649,418

PROCESS FOR THE REMOVAL OF TAR FROM CUPROUS CHLORIDE CATALYST SOLUTIONS

Carlyle J. Stehman, Dayton, Ohio, assignor to Monsanto Chemical Company, St. Louis, Mo., a corporation of Delaware No Drawing. Application June 23, 1951, Serial No. 233,253

9 Claims. (Cl. 252—414)

The present invention relates to an improvement in the production of acrylonitrile and more specifically to a method for controlling or removing tar which is formed during the production of acrylonitrile from acetylene and hydrogen cyanide in the presence of copper chloride catalysts.

The production of acrylonitrile by the catalytic reaction between acetylene and hydrogen cyanide in the presence of copper catalysts is described in U. S. Reissue Patent 23,265.

The catalytic solution employed in the production of acrylonitrile from acetylene and hydrogen cyanide essentially comprises an aqueous solution of cuprous chloride together with sodium and potassium chlorides and hydrogen chloride. It has been found that in the operation of this process for the production of acrylonitrile a minor proportion of a viscous, sticky tar is formed. This viscous tar is in part dispersed in the catalyst solution, and in part floats on top of the aqueous catalytic solution. It interferes with the smooth operation of the catalytic reactor by impeding the circulation of the liquid catalyst. Inasmuch as the acrylonitrile in vapor form leaves the catalytic solution by vaporization together with gases leaving the solution, it is obvious that the viscous tar also hinders the proper evolution of the acrylonitrile produced.

The tar produced in the catalytic reactor is also objectionable because of the carry-over of the tarry substances by the gaseous stream leaving the catalytic reactor. It has been found that the tar, although largely found in the top portion of the reactor, cannot be completely removed by simple draining because of its very viscous nature and the fact that the tar does not stratify or separate completely from the aqueous layer. Because of its viscous and sticky properties the tar deposits and adheres to various parts of the reactor and other processing vessels and pipes.

It has now been found that the tar may readily be removed from the catalytic reactor when a modifying substance is added to the reactor so as to consolidate the tar into a homogeneous liquid phase which may readily be withdrawn from the system, such as from a side outlet connected to the reactor body. It has also been found that certain organic compounds may be employed in the aqueous catalytic system for the purpose of modifying the tar.

The process in general comprises the removal of tar from the cuprous chloride catalyst solution employed in the reaction of acetylene and hydrogen cyanide in said catalytic solution to produce acrylonitrile, said process comprising adding to said catalyst solution a liquid organic compound containing a polar group selected from the class consisting of nitro, nitrile, phenolic and keto groups, said compound having a boiling point above 80° C. The consolidated homogeneous liquid tar is then separated from the said catalytic solution.

The compounds thus characterized and having ketone groups include diethyl ketone, dipropyl ketone, dibutyl ketone, diamyl ketone and the homologues thereof in addition to mixed ketones, such as ethylamyl ketone and methyl-α-naphthyl ketone. The nitrile compounds include the aliphatic and aromatic nitriles which are liquid and boil above 80° C., such as propionitrile, butyronitrile, valeronitrile, hexoinitrile, lauric nitrile, benzonitrile and also substituted nitriles such as β-chloropropionitrile. The nitro compounds include the aliphatic and aromatic derivatives, such as nitrobenzene, ortho-nitroethylbenzene, nitropropane, nitrobutane and nitropentane. The phenolic compounds also include the pure compounds and technical mixtures having the phenolic group, such as xylenol, cresol and ortho-chlorophenol.

Such tar modifier may be a volatile, liquid, organic compound which acts upon the tar present in the catalytic reactor, and which modifier may also be volatilized throughout the reaction system. Such modifier may in some cases also exert an inhibiting effect to diminish the polymerization of the acrylonitrile monomer during the subsequent distillation and other processing steps. Examples of such volatile modifying agents include the following:

1-nitropropane
Diisopropyl ketone
β-Chloropropionitrile

The tar modifier may also be a liquid of somewhat higher boiling point and lower vapor pressure which remains localized in the catalytic reactor proper without substantial vaporization into subsequent sections of the equipment. It is essential, however, that the boiling point shall be above 80° C. Examples of such tar modifiers include the following:

Xylenol
Nitrobenzene
Lauric nitrile
o-Nitro ethylbenzene
Methyl-α-naphthyl ketone The tar modifier may be present at all times during the reaction, or in some cases it may be added only at certain intervals when it is desired to purge accumulated tar from the system.

Mixtures of the above types of tar modifiers may also be employed in order to attain optimum fluidity and volatility characteristics.

In the operation of the acrylonitrile process in accordance with the present invention to modify the tar produced in the reaction, it has been found that the proportion of such tar modifier is not a critical variable. For example, such modifier may, in a preferred embodiment of the invention, be present in the range of from 0.01% to 10% by weight of the catalyst solution. However, higher and lower concentrations may likewise be employed, since the tar modifying agent is effective in low concentrations in effecting the fluidity and degree of dispersion of the tar. In addition, higher concentrations may also be employed without deleterious effects.

It has also been found that the process may be conducted with large proportions of the tar modifying compound, such as 50–100% by weight of the catalyst solution. In such embodiment the tar is dispersed or dissolved in the organic phase, which is withdrawn from the catalytic reactor for subsequent processing to remove the tar, after which the recovered organic compound may be recycled to the system.

The invention is further illustrated by the following examples:

Example 1

Acrylonitrile was produced from acetylene and hydrogen cyanide contacted in a copper salt catalyst solution containing the following components:

181 parts of water
15 parts of 37% HCl
41 parts of NaCl
111 parts of KCl

This solution was employed for acrylonitrile synthesis for a sufficiently long period of time for tar to be formed from the acetylene and the hydrogen cyanide, as well as by the various side reactions. The tar was present partly as a dispersion in the catalytic solution and partly as a supernatant layer which covered the top of the catalytic solution hindering the removal of product acrylonitrile leaving in vapor form from the catalyst solution. 1-nitropropane (boiling point 132° C.) in the proportion of 0.1%, based upon the weight of the total catalytic solution, was added to the catalyst solution. It was found that the 1-nitropropane modified the tar so that the tar became more fluid and could readily be drawn off as a liquid phase from the catalytic solution. It was also found that during the operation of the system, as described above, that a minor proportion of the nitropropane was volatilized from the reactor and was carried into the condensation system. This nitropropane was also found to aid in the cleaning of tar from the condenser system since this compound modified the tar deposits occurring in the condenser so that the tar gradually drained from the condenser and could be withdrawn as a liquid phase from the product receiver following the condenser.

Example 2

A catalytic system similar to that of Example 1 was employed for the production of acrylonitrile from acetylene and hydrogen cyanide until sufficient tar had been formed to be dispersed throughout the liquid catalyst. Mixed xylenols (boiling range 210–220° C.) in the proportion of 0.1% were added to the catalytic reactor. It was found that the xylenols did not vaporize in the reactor but entered into combination with the tar to modify the tar which could then be drawn off as a liquid layer leaving the reactor substantially free of tar.

Further examples were also carried out as experiments in which the respective tar modifiers listed below were added to the reaction system described above to modify the viscous tars encountered in acrylonitrile production.

| Ex. | Tar Modifier | Proportion, Percent | Boiling Point, ° C. | Result |
| --- | --- | --- | --- | --- |
| 3 | Diisopropyl ketone | 10.0 | 124 | Tar flowed easily. |
| 4 | β-Chloropropionitrile | 0.5 | 130 | Do. |
| 5 | Nitrobenzene | 5.0 | 211 | Do. |
| 6 | Lauric nitrile | 0.01 | 198 | Do. |
| 7 | o-Nitroethylbenzene | 0.1 | 223 | Do. |
| 8 | Methyl-α-naphthyl ketone | 0.5 | 183 | Do. |

What I claim is:

1. A process for the removal of tar from cuprous chloride catalyst solutions employed in the reaction of acetylene and hydrogen cyanide in said catalytic solution to produce acrylonitrile, which comprises adding to said catalyst solution a liquid, organic compound containing a polar group selected from the class consisting of nitro, nitrile, phenolic and keto groups, said liquid having a boiling point above 80° C., whereby the tar present in the catalyst solution is modified and consolidated into a separate substantially homogeneous liquid phase and thereafter separating a liquid phase of tar from the said catalytic solution.

2. A process for the removal of tar from cuprous chloride catalyst solutions employed in the reaction of acetylene and hydrogen cyanide in said catalytic solution to produce acrylonitrile, which process comprises adding to said catalytic solution a liquid, organic compound containing a nitro radical, said compound having a boiling point above 80° C., whereby the tar present in the catalyst solution is modified and consolidated into a separate substantially homogeneous liquid phase and thereafter separating a liquid phase of tar from the said catalytic solution.

3. A process for the removal of tar from cuprous chloride catalyst solutions employed in the reaction of acetylene and hydrogen cyanide in said catalytic solution to produce acrylonitrile, which process comprises adding to said catalytic solution a liquid, organic compound containing a nitrile group, said compound having a boiling point above 80° C., whereby the tar present in the catalyst solution is modified and consolidated into a separate substantially homogeneous liquid phase and thereafter separating a liquid phase of tar from the said catalytic solution.

4. A process for the removal of tar from cuprous chloride catalyst solutions employed in the reaction of acetylene and hydrogen cyanide in said catalytic solution to produce acrylonitrile, which process comprises adding to said catalytic solution a liquid, organic compound containing a phenolic group, said compound having a boiling point above 80° C., whereby the tar present in the catalyst solution is modified and consolidated into a separate substantially homogeneous liquid phase and thereafter separating a liquid phase of tar from the said catalytic solution.

5. A process for the removal of tar from cuprous chloride catalyst solutions employed in the reaction of acetylene and hydrogen cyanide in said catalytic solution to produce acrylonitrile, which process comprises adding to said catalytic solution, a liquid, organic compound containing a keto group, said compound having a boiling point above 80° C., whereby the tar present in the catalyst solution is modified and consolidated into a separate substantially homogeneous liquid phase, and thereafter separating a liquid phase of tar from the said catalytic solution.

6. A process for the removal of tar from cuprous chloride catalyst solutions employed in the reaction of acetylene and hydrogen cyanide in said catalytic solution to produce acrylonitrile, which process comprises adding to said catalytic solution, 1-nitropropane in the proportion of from 0.01% to 10% by weight, whereby the tar present in the catalyst solution is modified and consolidated into a separate substantially homogeneous liquid phase and thereafter separating a liquid phase of tar from the said catalytic solution.

7. A process for the removal of tar from cuprous chloride catalyst solutions employed in the reaction of acetylene and hydrogen cyanide in said catalytic solution to produce acrylonitrile, which process comprises adding to said catalytic solution, diisopropyl ketone in the proportion of from 0.01% to 10% by weight, whereby the tar present in the catalyst solution is modified and consolidated into a separate substantially homogeneous liquid phase and thereafter separating a liquid phase of tar from the said catalytic solution.

8. A process for the removal of tar from cuprous chloride catalyst solutions employed in the reaction of acetylene and hydrogen cyanide in said catalytic solution to produce acryonitrile, which process comprises adding to said catalytic solution, $\beta$-chloropropionitrile in the proportion of from 0.01% to 10% by weight, whereby the tar present in the catalyst solution is modified and consolidated into a separate substantially homogeneous liquid phase and thereafter separating a liquid phase of tar from the said catalytic solution.

9. A process for the removal of tar from cuprous chloride catalyst solutions employed in the reaction of acetylene and hydrogen cyanide in said catalytic solution to produce acrylonitrile, which process comprises adding to said catalytic solution, xylenol in the proportion of from 0.01% to 10% by weight, whereby the tar present in the catalyst solution is modified and consolidated into a separate substantially homogeneous liquid phase and thereafter separating a liquid phase of tar from the said catalytic solution.

CARLYLE J. STEHMAN.

References Cited in the file of this patent

UNITED STATES PATENTS

| Number | Name | Date |
|---|---|---|
| 2,234,177 | Kanhofer | Mar. 11, 1941 |
| 2,515,062 | Smith | July 11, 1950 |